US007865466B2

(12) United States Patent
Amies et al.

(10) Patent No.: US 7,865,466 B2
(45) Date of Patent: Jan. 4, 2011

(54) METHOD AND SYSTEM TO SYNCHRONIZE ACCOUNT NAMES ACROSS A PLURALITY OF SECURITY SYSTEMS

(75) Inventors: Alexander Phillip Amies, Irvine, CA (US); Dennis Raymond Doll, Newport Beach, CA (US); Bassam H. Hassoun, Riverside, CA (US); Brian Robert Matthiesen, Rancho Santa Margarita, CA (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/845,652

(22) Filed: Aug. 27, 2007

(65) Prior Publication Data

US 2009/0063494 A1 Mar. 5, 2009

(51) Int. Cl.
*G06F 17/30* (2006.01)
(52) U.S. Cl. .................. 707/616; 707/662; 707/781; 707/999.203
(58) Field of Classification Search ............... 707/1, 707/3, 9, 10, 100, 104.1, 200, 201, 203
See application file for complete search history.

(56) References Cited

U.S. PATENT DOCUMENTS 6,144,959 A * 11/2000 Anderson et al. ...... 707/999.009
6,405,218 B1 * 6/2002 Boothby ............... 707/999.201
6,529,909 B1   3/2003 Bowman-Amuah (Continued)

FOREIGN PATENT DOCUMENTS

WO        0141039 A2    6/2001

OTHER PUBLICATIONS

Ahn et al., "Managing Privacy Preferences for Federated Identity Management", ACM Digital Library, DIM '05, Fairfax, Virginia, Nov. 11, 2005, pp. 28-36.

(Continued)

*Primary Examiner*—Tim T. Vo
*Assistant Examiner*—Dangelino N Gortayo
(74) *Attorney, Agent, or Firm*—Yee & Associates, P.C.; Jeffrey S. LaBaw

(57) ABSTRACT

A system for synchronizing account names from a plurality of source security systems. In response to coupling a conversion system between the plurality of source security systems and a target security system, identity data from a human resource system and account data from the plurality of local source security systems is loaded into the conversion system. A name resolution rule set is retrieved and a unique account name identification is generated for a set of account names associated with an identity using the name resolution rule set. The set of account names associated with the identity is converted to the unique account name identification to produce a synchronized set of account names associated with the identity. Then, the synchronized set of account names associated with the identity is stored in the target security system.

17 Claims, 4 Drawing Sheets

U.S. PATENT DOCUMENTS

| | | | |
|---|---|---|---|
| 6,986,039 B1 * | 1/2006 | Leah et al. | 713/155 |
| 7,007,041 B2 * | 2/2006 | Multer et al. | 707/999.201 |
| 7,181,472 B2 * | 2/2007 | Cameron et al. | 707/201 |
| 7,275,259 B2 * | 9/2007 | Jamieson et al. | 726/8 |
| 7,412,720 B1 * | 8/2008 | Frey et al. | 726/8 |
| 7,428,750 B1 * | 9/2008 | Dunn et al. | 726/8 |
| 7,587,446 B1 * | 9/2009 | Onyon et al. | 709/203 |
| 7,676,829 B1 * | 3/2010 | Gui et al. | 726/5 |
| 2005/0027713 A1 * | 2/2005 | Cameron et al. | 707/100 |
| 2007/0233600 A1 * | 10/2007 | McMahon | 705/51 |
| 2007/0245013 A1 * | 10/2007 | Saraswathy et al. | 709/223 |

OTHER PUBLICATIONS

Bertino et al., "On Specifying Security Policies for Web Documents with an XML-based Language", ACM Digital Library, SAC/MAT '01, Chantilly, Virginia, May 3-4, 2001, pp. 57-64.

Covington et al., "Securing Context-Aware Applications Using Environment Roles", ACM Digital Library, SAC/MAT '01, Chantilly, Virginia, May 3-4, 2001, pp. 10-20.

* cited by examiner

METHOD AND SYSTEM TO SYNCHRONIZE ACCOUNT NAMES ACROSS A PLURALITY OF SECURITY SYSTEMS

BACKGROUND OF THE INVENTION

1. Field of the Invention

The present invention relates generally to an improved data processing system. More specifically, the present invention is directed to a computer implemented method, system, and computer usable program code for synchronizing account names for an identity across a plurality of security systems.

2. Description of the Related Art

Today, most computers are connected to some type of network. A network allows a computer to share information with other computer systems. The Internet is one example of a computer network. The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. Typically, the Internet uses a set of protocols called Transmission Control Protocol/Internet Protocol (TCP/IP).

A large number of Internet users require information to be gathered from across different organizational boundaries and heterogeneous platforms. Each of these different organizations and platforms may have different security systems that protect confidential data. As a result, each of these secure systems may require a secure identity credential, such as, for example, a user name and password, to gain access to the requested data. Consequently, a user must create a user name and password for each encountered security system. However, the same user may intentionally, or unintentionally, use different user names and passwords for these different security systems. Thus, the user has a ponderous job of remembering which user name and password to enter into which security system.

Solutions currently exist for converting an identity credential for a user in a single security system to a standardized identity credential, but the capability to resolve identity credential conflicts between multiple security systems is not presently available. Furthermore, these existing solutions do not work cross-security system to provide the ability to convert multiple security system distributions, such as, for example, AIX®, HP-UX®, and Linux®, into a single security system distribution, such as, for example, AIX®.

Therefore, it would be beneficial to have an improved computer implemented method, system, and computer usable program code for synchronizing a set of account names associated with an identity from a plurality of local security systems.

SUMMARY OF THE INVENTION

Illustrative embodiments provide a computer implemented method, system, and computer usable program code for synchronizing account names from a plurality of source security systems. In response to coupling a conversion system between the plurality of source security systems and a target security system, identity data from a human resource system and account data from the plurality of source security systems is loaded into the conversion system. A name resolution rule set is retrieved and a unique account name identification is generated for a set of account names associated with an identity using the name resolution rule set. The set of account names associated with the identity is converted to the unique account name identification. Conflicts between the set of account names associated with the identity are resolved to produce a synchronized set of account names associated with the identity. Then, the synchronized set of account names associated with the identity is stored in the target security system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
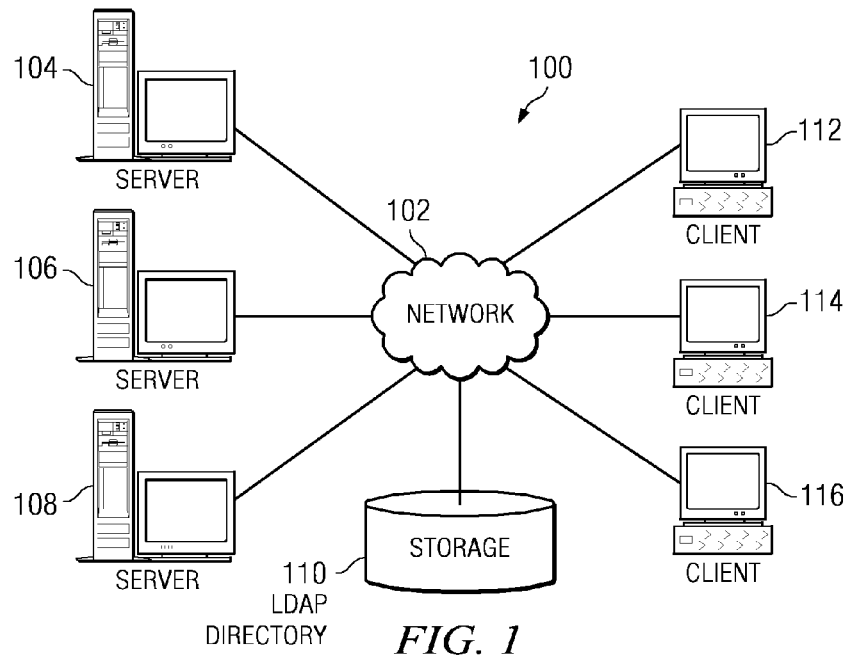
FIG. 1 is a pictorial representation of a network of data processing systems in which illustrative embodiments may be implemented.
Figure 2:
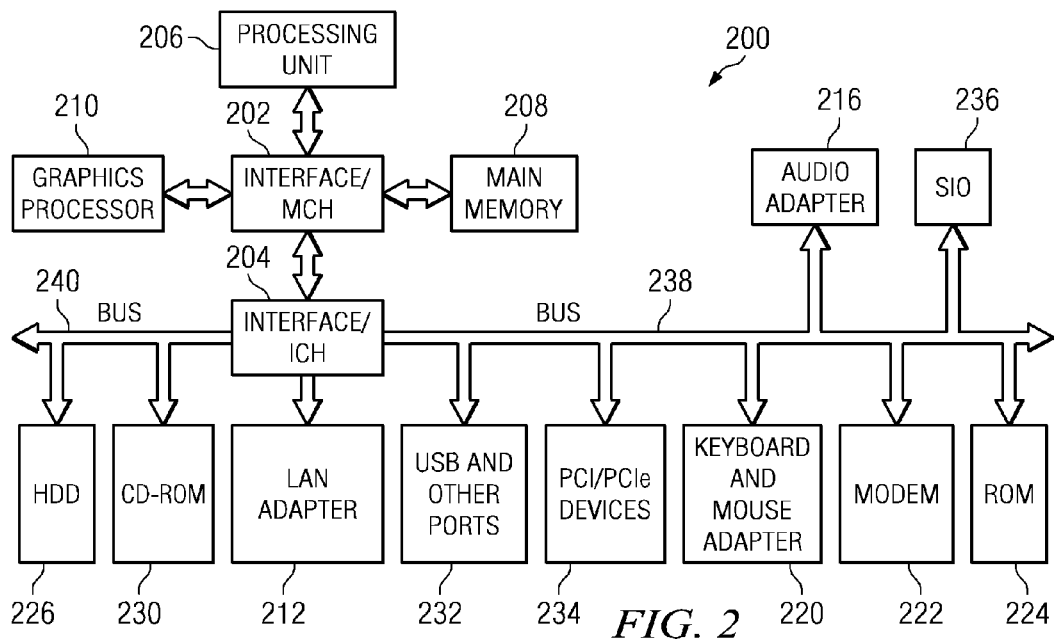
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104, server 106, and server 108 connect to network 102, along with storage unit 110. In addition, clients 112, 114, and 116 also connect to network 102. However, it should be noted that network data processing system 100 may include additional servers, clients, and other devices not shown. Clients 112, 114, and 116 are clients to servers 104 and 106. Also, clients 112, 114, and 116 may, for example, be personal computers or network computers.

In the depicted example, server 104 and server 106 represent secure servers that require security credentials for access by users of clients 112, 114, and 116. The credentials are associated with different security accounts names for the different users. Server 108 represents an identity data source, such as, for example, a human resource (HR) server that contains personnel files for employees of one or more enterprises. Identity data is information that identifies valid persons that own one or more security accounts within the enterprise.

Storage 110 represents a lightweight directory access protocol (LDAP) directory server. LDAP is an application protocol for querying and modifying directory services running over TCP/IP. Two common applications of LDAP are to store computer user/group data and address book information, such as persons, departments, and the like, but may also be used to store a broad range of other data. An LDAP directory is a type of database and is heavily optimized for read performance. LDAP servers index all data entries and use "filters" to select and return the person or group searched for. LDAP is appropriate for any kind of directory-like information, where fast lookups and less-frequent updates are normal.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface/MCH 202. Processing unit 206 may contain one or more processors and even may be implemented using one or more heterogeneous processor systems. Graphics processor 210 may be coupled to interface/MCH 202 through an accelerated graphics port (AGP), for example.

In the depicted example, local area network (LAN) adapter 212 is coupled to interface/ICH 204 and audio adapter 216, keyboard and mouse adapter 220, modem 222, read only memory (ROM) 224, universal serial bus (USB) and other ports 232, and PCI/PCIe devices 234 are coupled to interface/ICH 204 through bus 238, and hard disk drive (HDD) 226 and CD-ROM 230 are coupled to interface/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to interface/ICH 204.

An operating system runs on processing unit 206 and coordinates and provides control of various components within data processing system 200 in FIG. 2. The operating system may be a commercially available operating system such as the Advanced Interactive executive (AIX®) operating system. AIX® is a trademark of the International Business Machines Corporation in the United States, other countries, or both. Alternatively, the operating system may be Microsoft® Windows Vista™. Microsoft and Windows Vista are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for synchronizing account names associated with an identity from a plurality of source security systems. In response to coupling an identity conversion management system between the plurality of source security systems and a target security system, a security system conversion component loads identity data from an HR system and account data from the plurality of source security systems into the identity conversion management system. In addition, the security system conversion component retrieves a name resolution rule set and generates a unique account name identification for a set of account names associated with the identity using the name resolution rule set.

The security system conversion component converts the set of account names associated with the identity to the unique account name identification. Further, the security system conversion component resolves any conflicts between the set of account names associated with the identity to produce a synchronized set of account names associated with the identity. In other words, each account name within the set of synchronized account names includes the unique account name identification.

Then, the security system conversion component stores the synchronized set of account names associated with the identity in the target security system. The target security system may, for example, be a lightweight directory access protocol database server. In addition, the target security system may include one or more security systems. Furthermore, the target security system may be one or more of the source security systems.

Thus, illustrative embodiments convert one or more "local" source security systems to one or more "centralized" target security systems, while simultaneously identifying and resolving security account name conflicts. Illustrative embodiments use the identity data and security account data stored within the identity conversion management system as the basis for resolving these security account name conflicts. Illustrative embodiments may be implemented as a stand-alone application or as a plug-in to extend the capabilities of the identity conversion management system.

Illustrative embodiments discover and categorize all accounts in an enterprise and then synchronize all of these accounts. Illustrative embodiments convert each account name owned by one particular person, also known as an identity, to a single unique account name identification for that particular person. First, illustrative embodiments discover all the security accounts. Then, illustrative embodiments determine which security accounts belong to which person.

After discovering all the security accounts and determining account ownership, illustrative embodiments change the identification for each person's set of security accounts to the same unique name identification across all security systems for each valid person. In addition, illustrative embodiments change resources associated with the old name identification to the new unique name identification across all security systems. Further, illustrative embodiments also change group memberships to use the new unique name identification across all security systems.

Consequently, illustrative embodiments are superior to existing solutions for several reasons. First, illustrative embodiments use identity data to resolve cross-system naming conflicts to ensure accurate identification of the owner of each account by allowing the loading and matching of security accounts from the local source security systems to valid persons in the HR system. However, it should be noted that illustrative embodiments are not limited to utilizing an HR system to identify persons. Illustrative embodiments may utilize any type of system that contains identity data.

During a pre-conversion process, user-defined name resolution rules propose a unique name identification for a set of security account names associated with a person based on the identity data. For example, a security account name for identity, John Smith, at local security system number one is "JSMITH". In addition, security account names for identities, Jill Smith and John Smith, at local security system number two are "JSMITH" and "JOHNS", respectively. Using account ownership information to determine that security account names "JSMITH" in local security system number one and "JOHNS" in local security system number two both belong to John Smith, who is a known identity in the HR system, illustrative embodiments may propose renaming all accounts owned by John Smith to "JOSMITH" based on the name resolution rules. Also, illustrative embodiments may propose renaming all accounts owned by Jill Smith to "JISMITH".

Second, illustrative embodiments are vendor independent. In other words, illustrative embodiments are not bound to any security system distribution type and will connect to and convert any type of security system distribution. Third, illustrative embodiments may simultaneously convert a plurality of local source security systems. Thus, illustrative embodiments may provide name conflict resolution across multiple security system distributions at the same time.

Fourth, illustrative embodiments support conversion and consolidation of security system distributions. For example, the local source security systems and the target security system involved in the conversion process need not be of the same security system distribution. During the conversion process, user-defined rules provide resolution of schema differences between the security system distributions.

Finally, illustrative embodiments provide the transaction support to achieve the conversion. Once a resolution strategy is determined (i.e., the new account name is determined), illustrative embodiments initiate the necessary updates on the local security systems to convert the set of security account names associated with an identity to the new unique account name. In addition, illustrative embodiments generate an audit report on the success of the entire conversion process.

Figure 3:
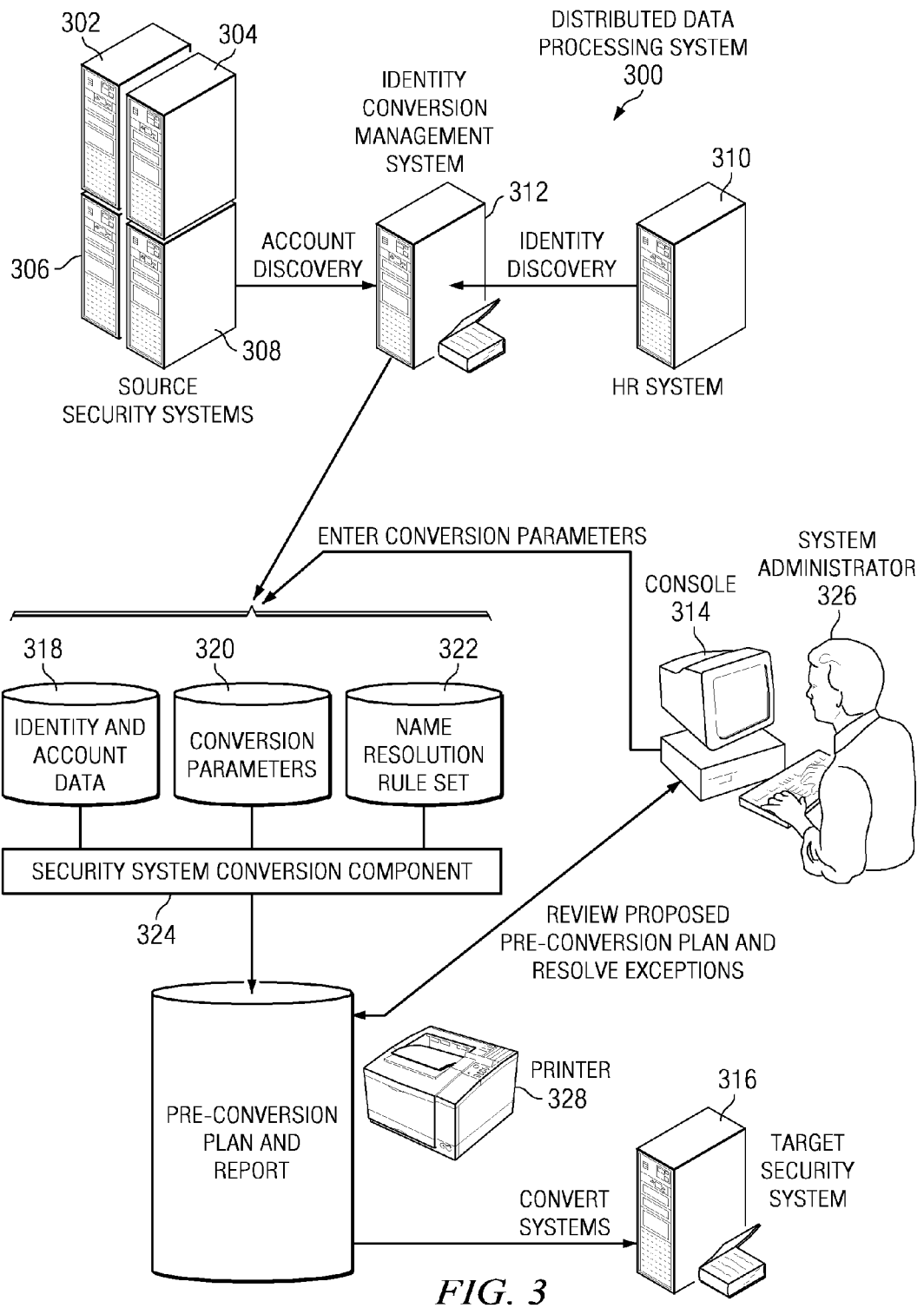
FIG. 3 is an exemplary illustration of a distributed data processing system that includes an identity conversion management system in accordance with an illustrative embodiment.

With reference now to FIG. 3, an exemplary illustration of a distributed data processing system that includes an identity conversion management system is depicted in accordance with an illustrative embodiment. Distributed data processing system 300 may, for example, be implemented in network data processing system 100 in FIG. 1. Distributed data processing system 300 includes source security systems 302, 304, 306, and 308, HR system 310, identity conversion management system 312, console 314, and target security system 316.

Source security systems 302, 304, 306, and 308 may, for example, be servers 104 and 106 in FIG. 1. Source security systems 302, 304, 306, and 308 are local security system servers that require security credentials for users of client devices, such as clients 112, 114, and 116 in FIG. 1, to access data contained within the local source security systems. Security credentials may, for example, include user name, password, biometric measurements, bar code, smartcard, or any combination thereof. Biometric measurements may include voice, fingerprint, facial, or retinal scan. In addition, source security systems 302, 304, 306, and 308 each store local security account data, such as account names for each person or group authorized to access data within the respective local security system.

HR system 310 may, for example, be server 108 in FIG. 1. HR system 310 stores identity data for valid persons that own security accounts within the enterprise. However, it should be noted that HR system 310 may represent any type system that stores identity data for personnel of one or more enterprises, institutions, organizations, and/or agencies.

Identity conversion management system 312 may, for example, be an identity management system, such as Tivoli® Identity Manager which is a product available from IBM®. Identity conversion management system 312 is a system that is used to convert, synchronize, and manage a set of account names for each different identity stored within distributed data process system 300. Identity conversion management system 312 stores identity and account data 318, conversion parameters 320, and name resolution rule set 322.

Identity conversion management system 312 utilizes security system conversion component 324 to control and coordinate the pre-conversion and conversion processes of illustrative embodiments. Security system conversion component 324 is a software component that may be implemented as a plug-in or as a stand-alone application. Identity conversion management system 312 downloads account data from selected source security systems 302, 304, 306, and 308 and identity data from HR system 310. Identity and account data 318 represents this downloaded data within identity conversion management system 312.

Console 314 is a terminal or desktop computer that system administrator 326 uses to monitor and control identity conversion management system 312. In addition, system administrator 326 uses console 314 to input conversion parameters 320 and name resolution rule set 322 into identity conversion management system 312. Security system conversion component 324 displays a security system conversion window on console 314 in order for system administrator 326 to input conversion parameters 320 and name resolution rule set 322.

Conversion parameters 320 are parameters for implementing the conversion process. Conversion parameters 320 list the one or more selected source security systems to be converted and one or more selected target security systems to receive and store the synchronized account name data for each account owner identity. Name resolution rule set 322 is a set of one or more rules that security system conversion component 324 uses to resolve security account name conflicts within the selected source security systems.

Target security system 316 may, for example, be LDAP directory 110 in FIG. 1. In addition, target security system 316 may represent one or more target security systems. Moreover, target security system 316 may represent one or more of source security systems 302, 304, 306, and 308. Target security system 316 stores the converted account name data for each account owner identity in the conversion process. In other words, security system conversion component 324 uses target security system 316 as a centralized storage for the synchronized set of account names containing the new unique account name associated with each identity.

Pairing security system conversion component 324 with identity conversion management system 312 provides a significant benefit since much of the information, such as identity data, account data, and account ownership, needed to perform the conversion process is already present in identity conversion management system 312. Security system conversion component 324 gathers account name and group data from existing local source security system servers 302, 304, 306, and 308 by, for example, using an adapter process from source security system servers 302, 304, 306, and 308 to identity conversion management system 312. In addition, security system conversion component 324 gathers identity data for valid persons by, for example, using an HR feed process from HR system 310.

Further, security system conversion component 324 assigns ownership to each of the security accounts owned by valid identities. Security system conversion component 324 may accomplish this ownership assigning process through the use of account adoption rules. Account adoption rules create ownership between a user name and a security account by matching the user name with a full name associated with a valid identity within the HR system.

Security system conversion component 324 utilizes name resolution rule set 322 to resolve naming conflicts between accounts based on identity and account data 318. For example, name resolution rule set 322 may contain a rule that states to arrive at a unique identification for an identity, use the first two letters of the first name, first five letters of the last name, and add one numeric character identifier. By way of example, security system conversion component 324 may convert the name "John Smith" to "JOSMITH1" as the new unique identification based on name resolution rule set 322.

Security system conversion component 324 accomplishes the renaming and migration of the account data by use of work flow and adapters of identity conversion management system 312. In addition, security system conversion component 324 utilizes a graphical user interface, which security system conversion component 324 displays on console 314. The graphical user interface may, for example, be a security system conversion window, to allow system administrator 326 to select one or more source and target security systems, define name resolution rule set 322, view a pre-conversion report that contains the proposed name changes, and launch the conversion process.

Procedurally, security system conversion component 324 interacts with identity conversion management system 312 to accomplish this conversion process. First, security system conversion component 324 loads the source security systems' account data to be converted and the identity data for valid persons. Then, security system conversion component 324 reconciles each local security system and resolves account ownership issues using the adoption rules. If the adoption rules do not resolve the account ownership issues, then system administrator 326 may perform a manual adoption process.

Security system conversion component 324 configures the conversion process by defining name resolution rule set 322, selecting one or more of source security systems 302, 304, 306, and 308 to be converted, and selecting target security system 316. Security system conversion component 324 identifies conflicts and proposes name resolutions by running a pre-conversion process. The pre-conversion process identifies naming conflicts between target security system 316, which may not be empty due to previous conversions, and the selected source security systems. Running this pre-conversion process identifies the naming conflicts, suggests a unique name to resolve the naming conflicts based on user-defined name resolution rules, and provides a detailed list of provisioning (move and rename) transactions to be performed during the conversion process.

System administrator 326 reviews a pre-conversion process report and may override a choice of a proposed new account name, if desired. Security system conversion component 324 may print a hard copy of the pre-conversion report on printer 328. Alternatively, security system conversion component 324 may display a soft copy of the pre-conversion report on console 314.

Subsequent to reviewing and approving the pre-conversion report, system administrator 326 launches the conversion process. Then, security system conversion component 324 reads the pre-conversion data and creates a provisioning transaction for each account record in the selected source security systems. Those security accounts with no name conflicts are "moved" unchanged to target security system 316. In other words, security system conversion component 324 performs an add operation to target security system 316, followed by a delete operation from the respective source security system that stored the moved account. Those security accounts with name conflicts for an identity are converted to the new unique account name while being "moved" to target security system 316. In other words, security system conversion component 324 performs an add operation of the new unique account name on target security system 316, followed by a delete operation of the old account name from the respective source security system.

Afterward, system administrator 326 reviews the results of the conversion process and handles any exceptions. Identity conversion management system 312 contains the conversion transactions as a multi-step provisioning transaction. After the conversion process is complete, security system conversion component 324 outputs the results of each conversion transaction in an audit report. The audit report may be output on console 314 and/or on printer 328. System administrator 326 reviews the status of the completed conversion. Security system conversion component 324 lists any failed, or warning, provisioning step in the audit report. System administrator 326 may take additional action based on the audit report.

It should be noted that even though FIG. 3 illustrates the use of illustrative embodiments within a distributed data processing system, those of ordinary skill in the art will appreciate that illustrative embodiments may also be utilized within a single data processing system without departing from the scope or spirit of illustrative embodiments. For example, illustrative embodiments may be used to synchronize security account names associated with an identity across a plurality of operating systems and applications, which require security access, within a single computer.

Figure 4:
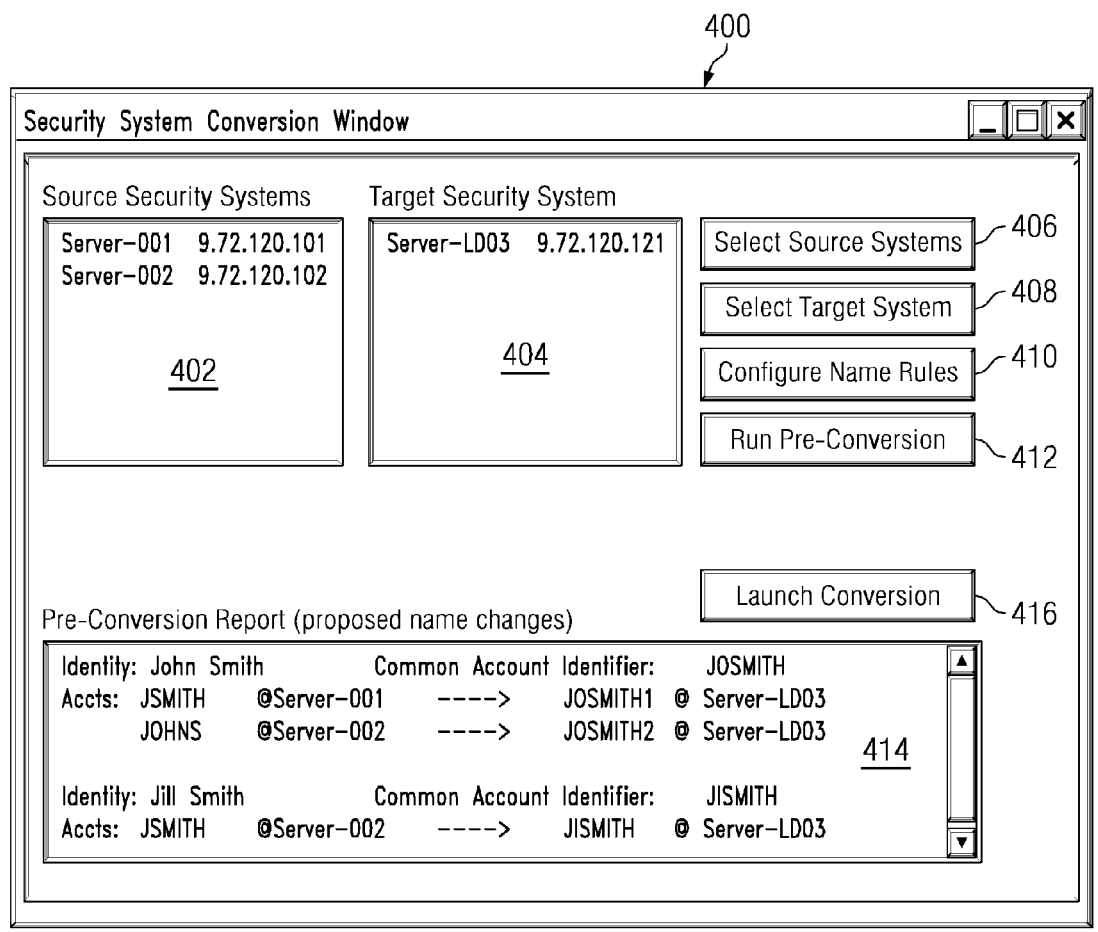
FIG. 4 is a pictorial representation of an exemplary security system conversion window in accordance with an illustrative embodiment.

With reference now to FIG. 4, a pictorial representation of an exemplary security system conversion window is depicted in accordance with an illustrative embodiment. Security system conversion window 400 is a graphical user interface that a security system conversion component, such as security system conversion component 324 in FIG. 3, displays within a control console, such as console 314 in FIG. 3. Security system conversion window 400 allows a system administrator, such as system administrator 326 in FIG. 3, to interact with an identity conversion management system, such as identity conversion management system 312 in FIG. 3.

The system administrator utilizes security system conversion window 400 to synchronize a set of account names associated with an identity from a plurality of source security systems, such as source security systems 302, 304, 306, and 308 in FIG. 3. Security system conversion window 400 includes source security systems pane 402, target security system pane 404, select source systems button 406, select target system button 408, configure name rules button 410, run pre-conversion button 412, pre-conversion report pane 414, and launch conversion button 416. However, it should be noted that security system conversion window 400 is only shown for exemplary purposes and is not meant as a limitation on illustrative embodiments. Illustrative embodiments may include more or fewer panes and buttons within security system conversion window 400 as necessary to accomplish processes of illustrative embodiments.

The security system conversion component uses source security systems pane 402 to list one or more source security systems selected by the system administrator for conversion. In this example, source security systems pane 402 lists server-001 and server-002, along with their respective IP addresses. The security system conversion component uses the IP addresses to locate the security systems within the network. The security system conversion component uses target security system pane 404 to list one or more target security systems selected by the system administrator to store the synchronized set of account names for each identity. In this example, target security system pane 404 lists server-LD03, along with its IP address.

The system administrator uses select source systems button 406 to select which source security systems to convert. The system administrator uses select target system button 408 to select which target security system stores the synchronized sets of account names. The system administrator uses configure name rules button 410 to configure a name resolution rule set, such as name resolution rule set 322 in FIG. 3, for converting the set of different account names associated with each identity into a unique account name identification for each identity.

The system administrator uses run pre-configuration button 412 to execute a pre-configuration process on identity and account data, such as identity and account data 318 in FIG. 3. Pre-conversion report pane 414 displays a report of the executed pre-conversion process. The pre-conversion report includes the identity of each person and the proposed unique account name identification for each identity.

In this example, identity John Smith is given a unique account name identification of "JOSMITH" during the pre-conversion process. As a result, security accounts "JSMITH" at server-001 and "JOHNS" at server-002 for John Smith are converted to "JOSMITH1" and "JOSMITH2", respectively, at server-LD03 during the conversion process. Also, in this example, identity Jill Smith is given a unique account name identification of "JISMITH" during the pre-conversion process. Consequently, security account "JSMITH" at server-002 for Jill Smith is converted to "JISMITH" at server-LD03 during the conversion process. However, it should be noted that the system administrator may change any or all of the unique account name identifications, if desired, prior to launching the conversion process.

The system administrator uses launch conversion button 416 to start execution of the conversion process. In other words, the system administrator launches the process to synchronize sets of security account names associated with identities from a plurality of security systems by selecting launch conversion button 416 using, for example, a mouse click.

Figure 5:
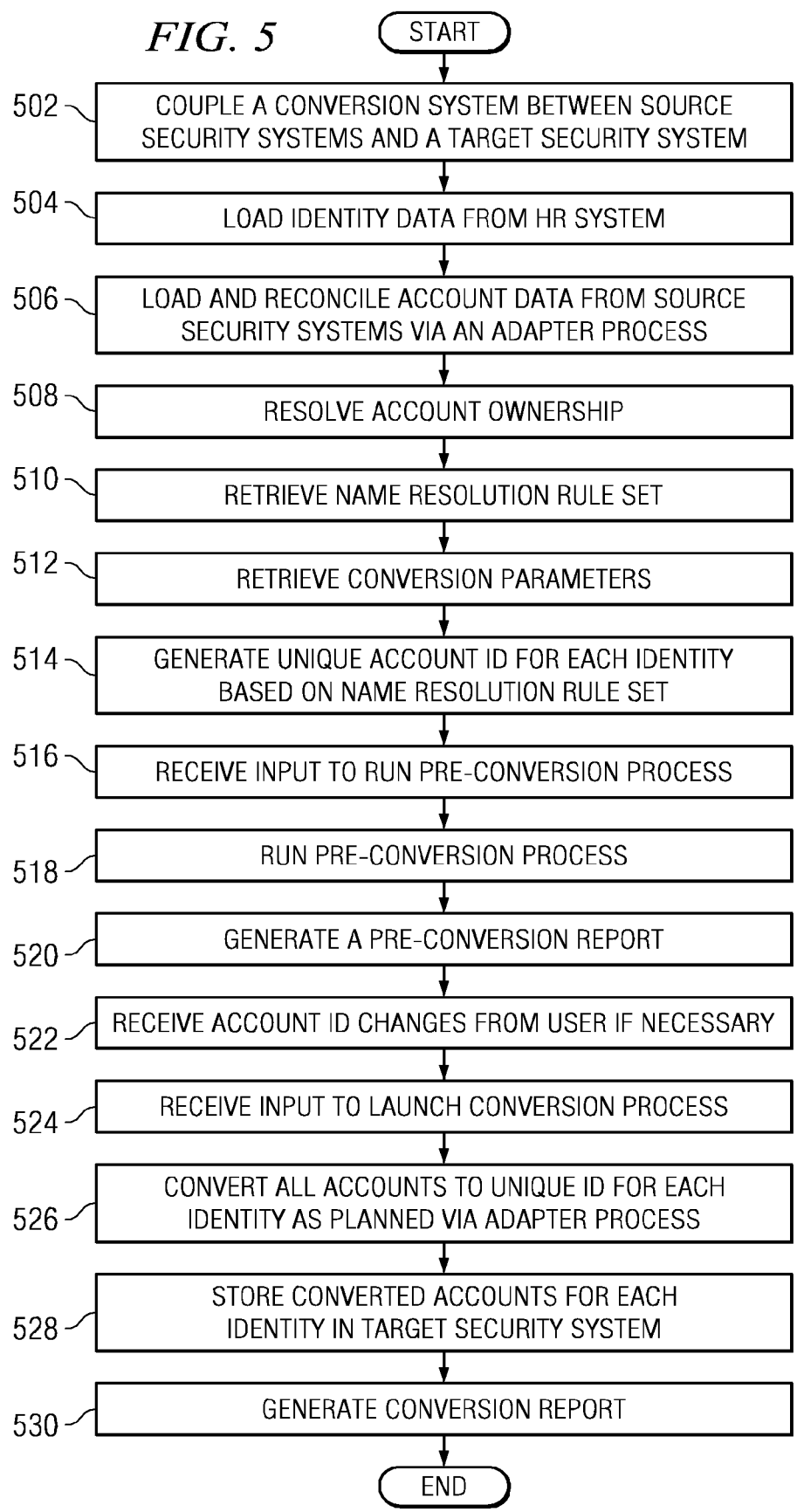
FIG. 5 is a flowchart illustrating an exemplary process for synchronizing different account names associated with an identity across a plurality of security systems in accordance with an illustrative embodiment.

With reference now to FIG. 5, a flowchart illustrating an exemplary process for synchronizing different account names associated with an identity across a plurality of security systems is shown in accordance with an illustrative embodiment. The process shown in FIG. 5 may be implemented in an identity conversion management system, such as, for example, identity conversion management system 312 in FIG. 3.

The process begins when a system administrator couples the identity conversion management system between source security systems and a target security system (step 502). For example, system administrator 326 couples identity conversion management system 312 between source security systems 302, 304, 306, and 308 and target security system 316 in FIG. 3. The target security system may, for example, be an LDAP directory, such as LDAP directory 110 in FIG. 1, which the identity conversion management system uses as centralized storage for synchronized account name data. However, it should be noted that the target security system may be any type security system and may also include one or more source security systems.

After the system administrator couples the identity conversion management system between the source security systems and the target security system in step 502, the identity conversion management system utilizes a security system conversion component, such as security system conversion component 324 in FIG. 3, to load identity data from an HR system, such as HR system 310 in FIG. 3 (step 504). Of course, it should be noted that the security system conversion component may load the identity data from any other identity data source in addition to, or instead of, the HR system. Then, the security system conversion component loads and reconciles account data from the source security systems via an adapter process (step 506).

Afterward, the security system conversion component resolves account ownership (step 508). In other words, the security system conversion component links or matches ownership of each security account to a valid person within the identity data. Subsequently, the security system conversion component retrieves a name resolution rule set (step 510) and conversion parameters (step 512), such as name resolution rule set 322 and conversion parameters 320 in FIG. 3.

Then, the security system conversion component generates a unique account name identification for each identity by utilizing the name resolution rule set (step 514). Afterward, the security system conversion component receives an input to run a per-conversion process (step 516). The input may be a manual mouse "click" by the system administrator over a run pre-conversion button, such as run pre-conversion button 412 within security system conversion window 400 in FIG. 4. Alternatively, the input may be an automatic input from an application.

In response to receiving the input to run the pre-conversion process in step 516, the security system conversion component runs the pre-conversion process (step 518). Subsequently, the security system conversion component generates a pre-conversion report (step 520). The security system conversion component may display the generated pre-conversion report on a control console, such as console 314 in FIG. 3, or print the generated pre-conversion report on a printer, such as printer 328 in FIG. 3, for the system administrator to review.

Then, the identity system conversion component receives account identification changes from the system administrator after reviewing the pre-conversion report, if necessary (step 522). Afterward, the identity system conversion component receives another input to launch the conversion process (step 524). Once again, the input may be a manual mouse "click" by the system administrator on an appropriate input button, such as launch conversion button 416 in FIG. 4, or the input may be an automatic input from an application.

Subsequent to receiving the input to launch the conversion process in step 524, the identity system conversion component launches the conversion process by converting all security account names to the unique account name identification for each identity as planned via the adapter process (step 526). Then, the identity system conversion component stores the converted account names for each identity in the target security system (step 528) and generates a conversion report (step 530). The process terminates thereafter.

Thus, illustrative embodiments provide a computer implemented method, system, and computer usable program code for synchronizing a set of account names associated with an identity from a plurality of security systems. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for synchronizing account names from a plurality of source security systems, the computer implemented method comprising:

responsive to coupling a conversion system between the plurality of source security systems and a target security system, loading by the conversion system identity data for a user that owns security accounts from a human resource system and account data for the user authorized to access data in the plurality of source security systems from the plurality of source security systems;

discovering by the conversion system account names associated with the user stored across the plurality of source security systems within the account data;

retrieving by the conversion system a name resolution rule set;

generating by the conversion system a unique account name identification for the discovered account names associated with the user stored across the plurality of source security systems using the name resolution rule set;

converting by the conversion system the discovered account names associated with the user stored across the plurality of source security systems to the unique account name identification, wherein conflicts between the discovered account names stored across the plurality of source security systems are resolved by producing a synchronized plurality of account names each including the unique account name identification associated with the user; and storing by the conversion system the synchronized plurality of account names each including the unique account name identification associated with the user in the target security system, wherein during conversion the discovered account names associated with the user are deleted from the plurality of source security systems that stored the discovered account names in response to the conversion system storing the synchronized plurality of account names in the target security system.

2. The computer implemented method of claim 1, wherein the target security system is a plurality of target security systems.

3. The computer implemented method of claim 1, wherein the target security system is one or more of the plurality of source security systems.

4. The computer implemented method of claim 1, wherein the target security system is a lightweight directory access protocol database server.

5. The computer implemented method of claim 1, wherein the discovered account names associated with the user are one of a plurality of sets of account names contained in the account data, and wherein the user is one of a plurality of users contained within the identity data.

6. The computer implemented method of claim 1, wherein the plurality of source security systems are simultaneously converted.

7. A computer program product stored in a computer usable storage medium having computer usable program code embodied therein for synchronizing account names from a plurality of source security systems, the computer program product comprising:

computer usable program code configured to load identity data for a user that owns security accounts from a human resource system and account data for the user authorized to access data in the plurality of source security systems from the plurality of source security systems in response to coupling the conversion system between the plurality of source security systems and a target security system;

computer usable program code configured to discover account names associated with the user stored across the plurality of source security systems within the account data;

computer usable program code configured to retrieve a name resolution rule set;

computer usable program code configured to generate a unique account name identification for the discovered account names associated with the user stored across the plurality of source security systems using the name resolution rule set;

computer usable program code configured to convert the discovered account names associated with the user stored across the plurality of source security systems to the unique account name identification, wherein conflicts between the discovered account names stored across the plurality of source security systems are resolved by producing a synchronized plurality of account names each including the unique account name identification associated with the user; and computer usable program code configured to store the synchronized plurality of account names each including the unique account name identification associated with the user in the target security system, wherein during conversion the discovered account names associated with the user are deleted from the plurality of source security systems that stored the discovered account names in response to the conversion system storing the synchronized plurality of account names in the target security system.

8. The computer program product of claim 7, wherein the target security system is a plurality of target security systems.

9. The computer program product of claim 7, wherein the target security system is one or more of the plurality of source security systems.

10. The computer program product of claim 7, wherein the target security system is a lightweight directory access protocol database server.

11. The computer program product of claim 7, wherein the discovered account names associated with the user are one of a plurality of sets of account names contained in the account data, and wherein the user is one of a plurality of users contained within the identity data.

12. The computer program product of claim 7, wherein the plurality of source security systems are simultaneously converted.

13. An apparatus for synchronizing account names from a plurality of source security systems, the apparatus comprising:

a bus system;

a storage device connected to the bus system, wherein the storage device includes a set of instructions; and a processing unit connected to the bus system, wherein the processing unit executes the set of instructions to load identity data for a user that owns security accounts from a human resource system and account data for the user authorized to access data in the plurality of source security systems from the plurality of source security systems in response to coupling the conversion system between the plurality of source security systems and a target security system; discover account names associated with the user stored across the plurality of source security systems within the account data; retrieve a name resolution rule set; generate a unique account name identification for the discovered account names associated with the user stored across the plurality of source security systems using the name resolution rule set; convert the discovered account names associated with the user stored across the plurality of source security systems to the unique account name identification, wherein conflicts between the discovered account names stored across the plurality of source security systems are resolved by producing a synchronized plurality of account names each including the unique account name identification associated with the user; and store the synchronized plurality of account names each including the unique account name identification associated with the user in the target security system, wherein during conversion the discovered account names associated with the user are deleted from the plurality of source security systems that stored the discovered account names in response to the conversion system storing the synchronized plurality of account names in the target security system.

14. The apparatus of claim 13, wherein the target security system is a plurality of target security systems.

15. The apparatus of claim 13, wherein the target security system is one or more of the plurality of source security systems.

16. The apparatus of claim 13, wherein the target security system is a lightweight directory access protocol database server.

17. The apparatus of claim 13, wherein the plurality of source security systems are simultaneously converted.

* * * * *